United States Patent [19]

Shelley

[11] 4,070,680
[45] Jan. 24, 1978

[54] THERMAL PRINTER-PLOTTER SYSTEM FOR MULTI-DIRECTIONAL PRINTING AND PLOTTING

[75] Inventor: David J. Shelley, San Diego, Calif.

[73] Assignee: Hewlett-Packard Company, Palo Alto, Calif.

[21] Appl. No.: 716,033

[22] Filed: Aug. 20, 1976

[51] Int. Cl.² .................... G01D 15/10; H05B 3/00
[52] U.S. Cl. .................................. 346/76 R; 219/216
[58] Field of Search ............. 346/76 R, 155; 219/216

[56] References Cited

U.S. PATENT DOCUMENTS

| | | | |
|---|---|---|---|
| 2,937,913 | 5/1960 | Boyle | 346/29 |
| 3,611,419 | 10/1971 | Blumenthal | 346/155 |
| 3,814,227 | 6/1974 | Hurd et al. | 197/1 R |
| 3,840,878 | 10/1974 | Houston et al. | 346/76 R X |

*Primary Examiner*—George H. Miller, Jr.
*Attorney, Agent, or Firm*—Robert S. Hulse

[57] ABSTRACT

A printer-plotter system is provided having a single horizontally movable, print-plot head comprising geometrically arranged thermal resistor elements which are processor-controlled for plotting continuous multi-directional line segments and for printing, while plotting, upper and lower case alphanumeric characters and punctuation characters in four orthogonal directions. Characters are printed in 5-columns-by-7-rows dot matrix form, with neighboring dots partly overlapping each other in order to impart a continuous or drawn appearance rather than a discontinuous dot appearance to the printed characters. The geometric arrangement of the head elements also provides for varying the width of line segments plotted along selected orthogonal directions.

19 Claims, 5 Drawing Figures $$\begin{pmatrix}E1\\P8\end{pmatrix}\begin{pmatrix}E1\\P9\end{pmatrix}\begin{pmatrix}E1\\P10\end{pmatrix}\begin{pmatrix}E1\\P11\end{pmatrix}\begin{pmatrix}E1\\P12\end{pmatrix}$$

$$\begin{pmatrix}E2\\P5\end{pmatrix}$$

$$\begin{pmatrix}E3\\P2\end{pmatrix}$$

$$\begin{pmatrix}E4\\P7\end{pmatrix}\begin{pmatrix}E4\\P8\end{pmatrix}\begin{pmatrix}E4\\P9\end{pmatrix}$$

$$\begin{pmatrix}E5\\P4\end{pmatrix}$$

$$\begin{pmatrix}E6\\P1\end{pmatrix}$$

$$\begin{pmatrix}E7\\P6\end{pmatrix}\begin{pmatrix}E7\\P7\end{pmatrix}\begin{pmatrix}E7\\P8\end{pmatrix}\begin{pmatrix}E7\\P9\end{pmatrix}\begin{pmatrix}E7\\P10\end{pmatrix}$$

Figure 4

THERMAL PRINTER-PLOTTER SYSTEM FOR MULTI-DIRECTIONAL PRINTING AND PLOTTING

BACKGROUND OF THE INVENTION

The present invention relates generally to printer-plotter systems and, more particularly, to dot-matrix thermal printer-plotters. Thermal printer-plotters are known which have thermal resistive elements (dots) arranged in matrix form, each column and each row of matrix having multiple resistive elements.

However, to form the vertical portion of a character, the column elements of the matrix are sometimes energized simultaneously. This often results in non-uniformity of contrast between portions of the character formed by a given number of the matrix elements energized simultaneously and other portions of the character formed by a different number of simultaneously energized elements. This non-uniformity in contrast is caused by parasitic losses, such as are produced by a battery return lead and resistance, which reduce the amount of powder supplied to each element as a function of the number of simultaneously energized elements.

To avoid this problem of non-uniformity in contrast associated with simultaneously energized elements, a printer-plotter with individually energizable print and plot elements is needed. Also, for purposes of compactness and simplicity, the elements should be arranged in a single print-plot head in such a manner that, to print a selected character, the same elements may be used to print the character in one direction as to print the character in other directions.

SUMMARY OF THE INVENTION

According to the illustrated preferred embodiment of the present invention, a print-plot system is provided having a central processing unit (CPU), a memory unit containing a stored program, and a printer-plotter unit with a print-plot head. The print-plot head comprises ten geometrically-arranged thermal resistive elements, one of which is used to plot lines and nine of which are used to print upper and lower case alphanumeric characters in four orthogonal directions, under program control.

The geometric arrangement of the character - printing elements enables these elements to be individually energized when printing a character, thereby eliminating the problem of non-uniformity of contrast associated with simultaneously energized contiguous printing elements. Any of the printing elements may be energized simultaneously with the plotting element in order to print characters while plotting selected line segments. The arrangement of the elements also diminishes the dot appearance of the printed characters and improves character appearance by printing the dots in slightly overlapped fashion. Furthermore, the arrangement of the elements provides for varying the thickness of a character or orthogonal line segments by selectively energizing one or more individual elements.

BRIEF DESCRIPTION OF THE DRAWINGS

FIG. 4 is a diagrammatic illustration of elements of the print-plot head of FIG. 3 used to print a character.

DESCRIPTION OF THE PREFERRED EMBODIMENT

Figure 1:
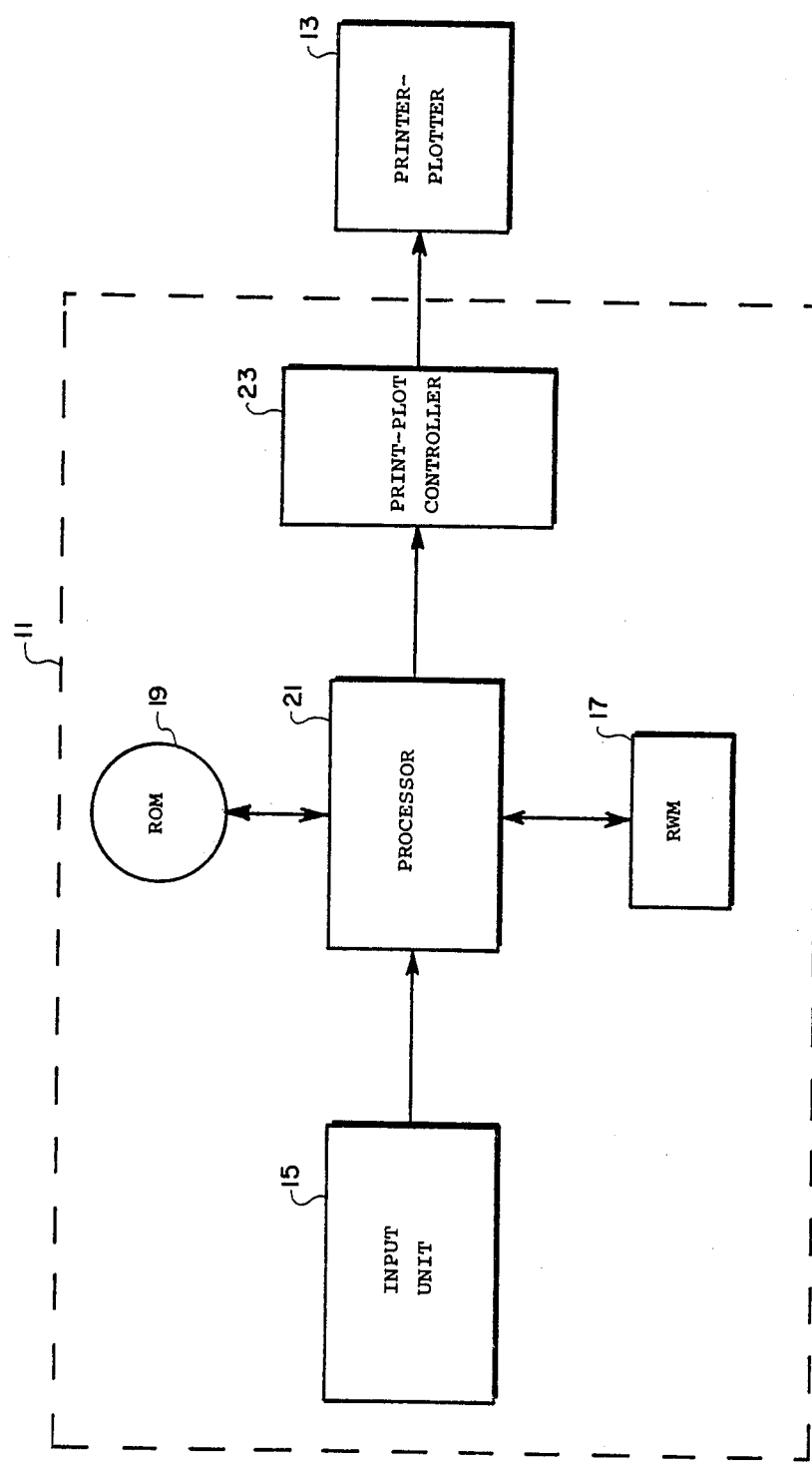
FIG. 1 is a block diagram of the printer-plotter system of the present invention.

FIG. 1 shows a printer-plotter system having a logic unit 11 and a printer-plotter unit 13. The logic unit 11 comprises an input unit 15 such as a keyboard, optical reader or magnetic tape device for entering data into the system, a read-write memory (RWM) unit 17, a read-only memory (ROM) unit 19 having a stored routine, a processing unit 21 and a print-plot controller 23. The processing unit 21 stores the data from input unit 15 into RWM 17, processes the stored data under control of the ROM routine, and applies the processed data via controller 23 to printer-plotter 13 for plotting and printing.

Figure 2:
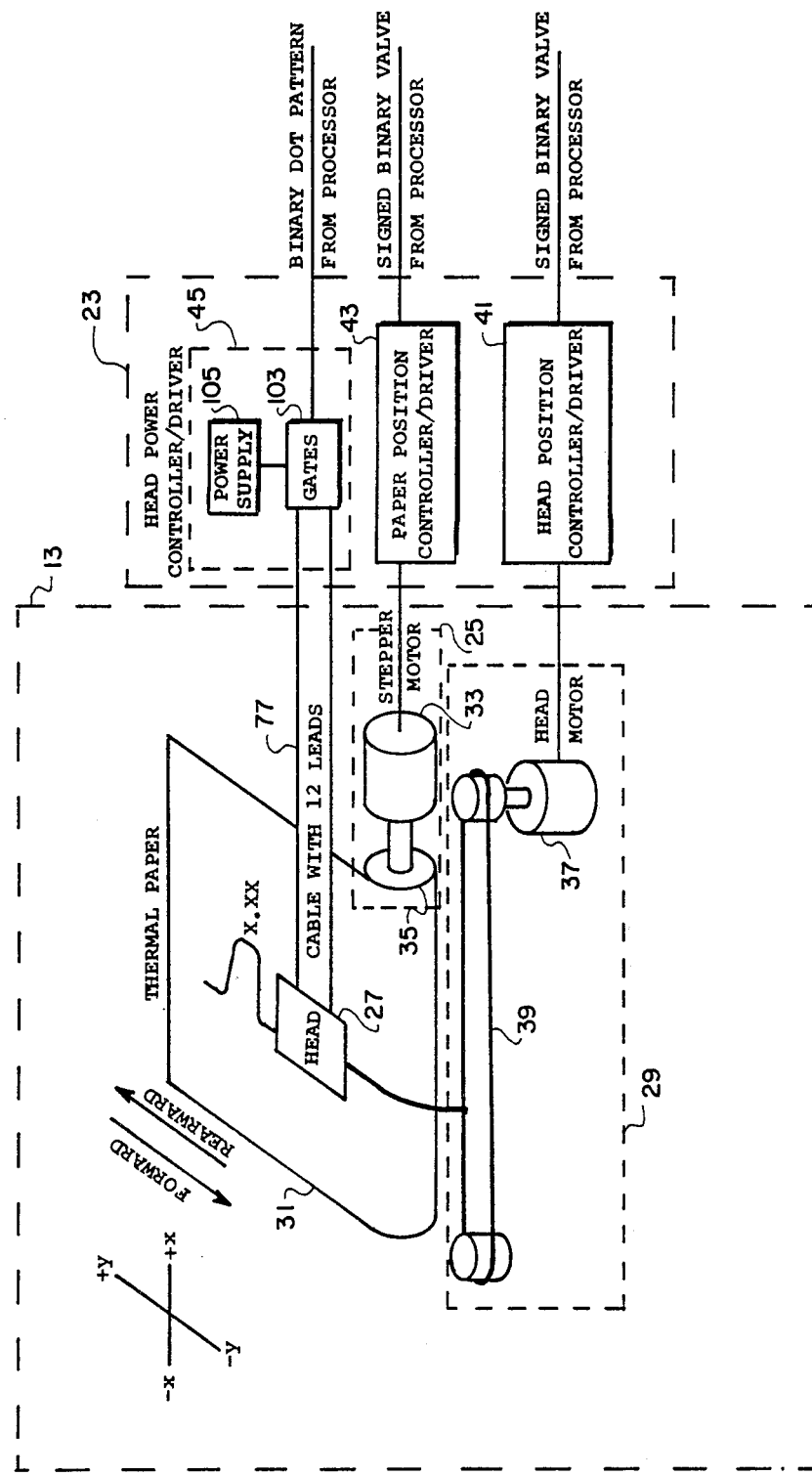
FIG. 2 is a combined perspective view and block diagram illustrating the printer-plotter and controller of the system of FIG. 1.

FIG. 2 shows the printer-plotter 13 comprising a web or paper drive unit 25, a print-plot head 27 engaging the web, and a coordinate actuator or head drive unit 29 for moving the print-plot head 27. The paper drive unit 25 includes a stepper motor 33 coupled to a platen 35 for moving paper 31 forward (from $+Y$ to $-Y$) or rearward (from $-y$ to $+y$). The head drive unit 29 includes a head motor coupled to head 27 by means of a guide wire 39 for moving the head 27 from left to right (from $-x$ to $+x$) or from right to left (from $+x$ to $-x$). FIG. 2 also shows print-plot controller 23 comprising a head position controller/driver 41, a paper position controller/driver 43, and a head power controller/driver 45. Upon application of a signed, binary value from processor 21 to head position controller/driver 41 (the sign of the binary value specifying the direction of movement of the head 27 and the magnitude of the binary value indicating the number of steps that the head 27 is to be moved), the controller/driver 41 converts the signed binary value to two signals with a $+90°$ phase delay between the two signals when the sign is negative, and to two signals with $-90°$ phase delay between the signals when the sign is positive, and applies the two signals to head motor 37. Head motor 37 moves head 27 a distance corresponding to the number of cycles of the signals, in the direction from $-x$ to $+x$ when the applied signals are out of phase by $+90°$, and from $+x$ to $-x$ when the applied signals are out of phase by $-90°$. In similar manner, a signed binary value applied by processor 21 to paper position controller/driver 43 causes controller/driver 43 to apply two signals with $+90°$ or $-90°$ phase delay between them to stepper motor 33. Stepper motor 33 rotates a sprocketed portion of platen 35, moving paper 31 a distance corresponding to the number of cycles of the applied signals. Paper 31 is moved forward ($+y$ to $-y$) when the signals applied to motor 33 are out of phase by $+90°$, and moved rearward ($-y$ to $+y$) when the signals applied to motor 33 are out of phase by $-90°$. A binary pattern of ten bits is applied, in parallel, by processor 21 to head power controller/driver 45 specifying the thermal elements of head 27 that are to be energized.

Figure 3:
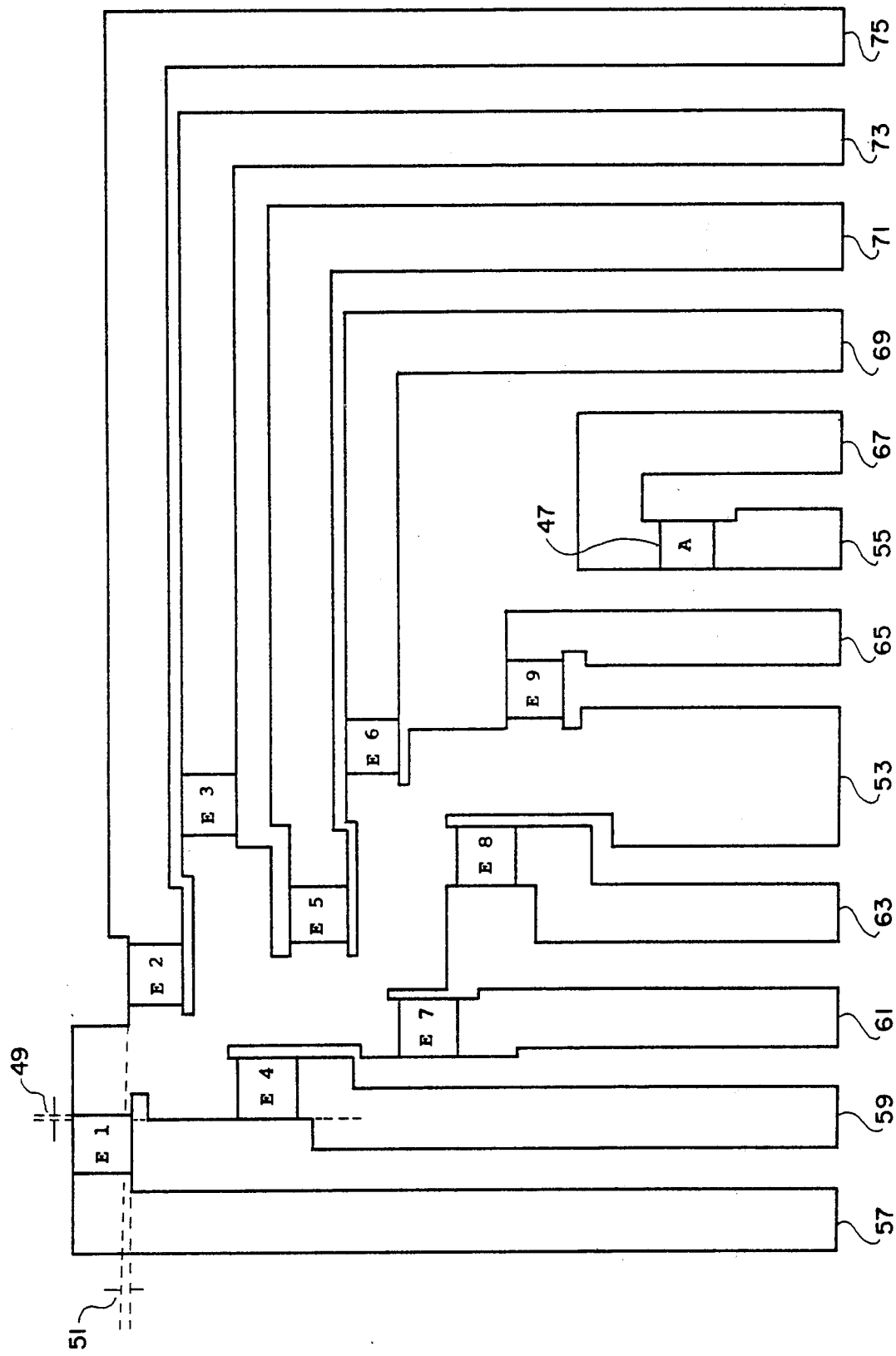
FIG. 3 is a top view of the elements of the print-plot head employed in the system of FIG. 1.

FIG. 3 shows a top view of the thermal resistive elements of head 27. (In an alternative embodiment of the present invention the thermal elements of the head may be arranged along a single diagonal.) Seven elements are used for printing upper and lower case characters, at least two elements are used for printing punctuation characters, and one element 47 is used to plot lines. For example, when the head 27 is moved from left ($-x$) to right ($+x$), to print upper and lower case characters E and e, thermal elements E1, E2, E3, E4, E5, E6 and E7 are used, to print a lower case character with a "descending portion" such as "p", elements E3, E4, E5, E6, E7, E8 and E9 are used, and to print a punctuation mark such as a comma, elements E7, E8 and E9 are used. Each printing element partly overlaps its neighboring element in a column-wise and row-wise fashion as indicated by reference numerals 49 and 51 of FIG. 3.

$$\begin{pmatrix} E4 \\ p7 \end{pmatrix} \begin{pmatrix} E7 \\ p7 \end{pmatrix}$$

means that at head position seven, elements E4 and E7 are energized to form two other portions of the E, and so on. Note that at head position three, elements E8 is in position for forming a punctuation character or lower portion of a lower-case character (if such a character were needed) and, hence, is not energized to form a portion of the E. Table 1 shows the elements used to print upper-case character "P," punctuation character ",", and lower-case character "p."

TABLE 1

| Orientation of character | Example of character orientation | Character orientation (Cartesian) | Direction of head movement | Direction of paper movement | Element used to form character in order of use, from left to right | Element used to form descender portion (in order of use) |
| --- | --- | --- | --- | --- | --- | --- |
| First orthogonal | P, | $+y$ to $-y$ | $-x$ to $+x$ | No movement | E6,E3,E5,E2, E7,E4,E1 | E9,E8 |
| Second orthogonal | | $-y$ to $+y$ | $+x$ to $-x$ | No movement | E4,E7,E5,E8, E3,E6,E9 | E1,E2 |
| Third orthogonal | | $-x$ to $+x$ | No movement | $+y$ to $-y$ | E1,E2,E3,E4, E5,E7,E8 | E6,E9 |
| Fourth orthogonal | | $+x$ to $-x$ | No movement | $-y$ to $+y$ | E9,E8,E7,E6, E5,E3,E2 | E4,E1 |
| First orthogonal | P | $+y$ to $-y$ | $-x$ to $+x$ | No movement | E9,E6,E3,E8, E5,E7,E4 | None |

This overlapping arrangement permits the printing of contiguous, partly-overlapping dots, forming characters having a non-dot-like appearance. The elements are connected to twelve leads, one lead being a ground lead 53 common to elements E1–E9, nine lead being conductor leads 57–63, 65 and 69–75, each connected to one of the nine elements E1–E9, and one grounded lead 55 and one conductor lead 67 connected to plot element 47. The twelve lead to the head 27 are, in turn, connected to head power controller/driver 45 of printer-plotter controller 23 via a flexible cable 77. Processor 21, under control of the routine shown in FIG. 5 and Table 2 following, moves the head 27 or paper 31, or both, to a selected position and applies a binary pattern to head 27, energizing selected elements to plot a point or to print one or more points as part of a character.

Figure 5:
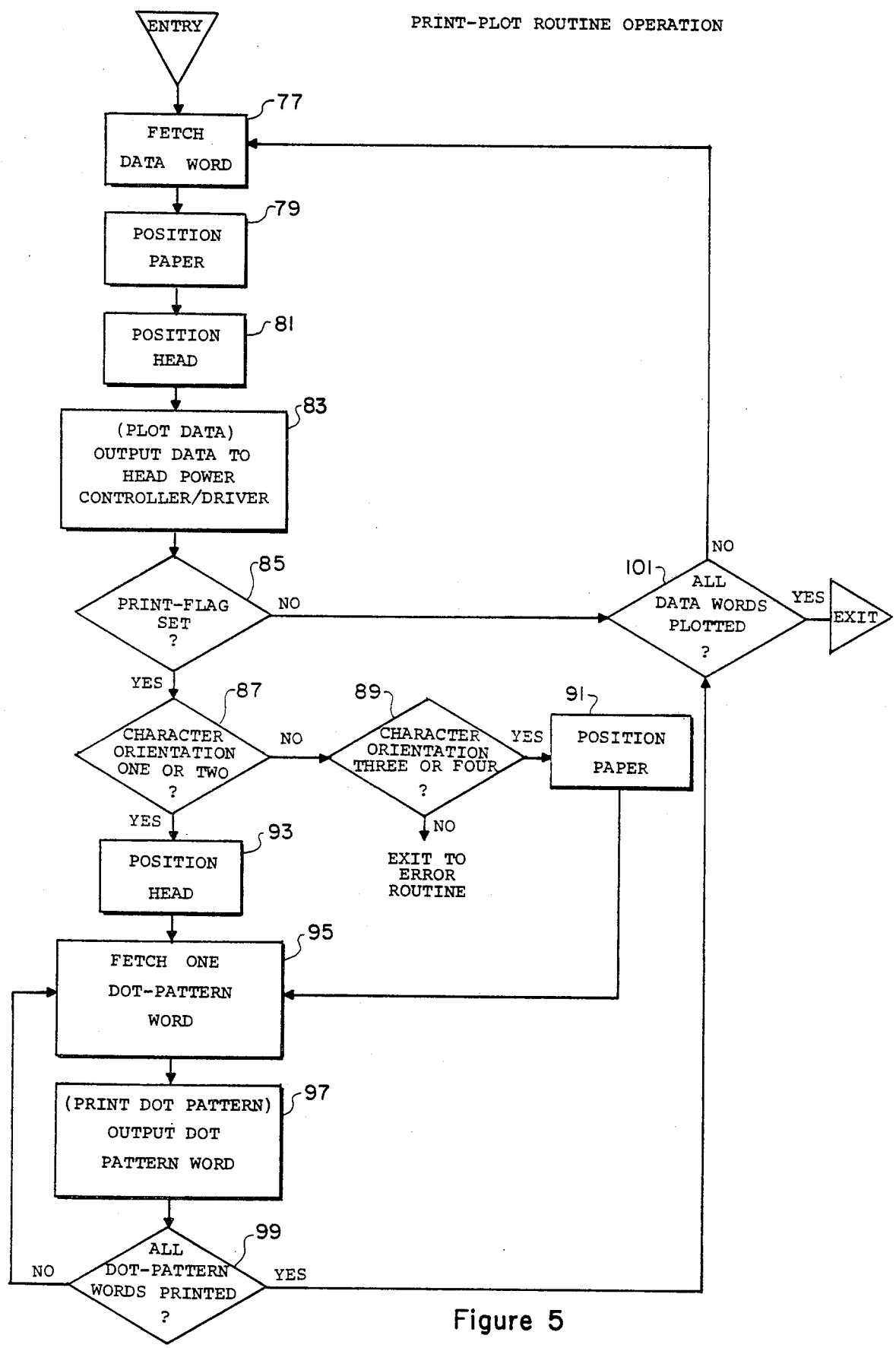
FIG. 5 is a logic flow diagram of a routine stored in a ROM of the system of FIG. 1, illustrating one mode of operation of the system.

FIG. 4 shows the elements E1–E7 used to print the character "E," and the particular move or position of the head (p1 being a first position, p2 being a second position, and so on) at which each element is energized. The elements E8 and E9 are not used to print portions of the E, instead, these two elements are used to print punctuation marks and the lower portions of lower-case characters when such characters are oriented in the same direction as the E. For example $$\begin{pmatrix} E6 \\ p1 \end{pmatrix}$$

means that at an initial positioning of head 27 element E6 is energized to form a portion of character E, $$\begin{pmatrix} E3 \\ p2 \end{pmatrix}$$

means that at the next positioning of the head (i.e., at head position two), element E3 is energized to form another portion of the E, A flow chart of the operations performed by processor 21 under control of the routine stored in ROM 19 (FIG. 1) is shown in FIG. 5. Each block of the flow chart represents an operation performed by processor 21. For a given sequence of input data received and stored by logic unit 11, or generated by processor 21 (pursuant to calculation operation) and stored in RWM 17 for plotting and printing, the print-plot routine as shown by block 77 accesses the first data word to be plotted, positions the paper and head as shown by blocks 79 and 81, and plots the contents of the accessed data word. As shown by block 83, plotting is achieved by applying the accessed data to head power controller/driver 45 (FIG. 2) where the data is used to gate power from a power supply 105 to plot element 47 of head 27. Following the plotting operation as block 85 shows, a test is made to determine if printing is to be performed. If no printing is to be performed (indicated by a print flag not having been preset), control is transferred to block 101. If a print flag has been present indicating that character data are to be printed, the orthogonal orientation of the character is determined as shown by blocks 87 and 89, and head 27 or paper 31 is moved to a selected coordinate as shown by blocks 93 and 91, causing selected elements of the head to occupy selected positions over the paper 31 corresponding to the data word to be printed. To accomplish the head and paper movement indicated by blocks 93 and 91, for a given character orientation determined from blocks 87 and 89, signed binary values are applied to head-position and paper-position controller/drivers 41, 43. Bit patterns (dot patterns in binary form) of alphanumeric characters printable by the system are pre-stored in word groups in ROM 19, each word group containing the dot (bit) pattern corresponding to one character. For a given character stored in RWM 17, the group of words from ROM 19 containing the dot pattern corresponding to the stored character are accessed. This access operation is shown by block 95, after which the contents of each word are applied to head power controller/driver 45 (FIG. 2) as shown by block 97. As shown by gates 103 and power supply 105 of FIG. 2, the contents of each dot-pattern word serve to gate power from power supply 105 to those elements of the head for which there is a matching "1" bit in the dot-pattern. As block 99 shows, after each dot-pattern word is provided, control is returned to blocks 95 and 97 for successive dot-pattern words to be output. When all of the dot-pattern words (preselected for annotating a plotted data value) have been printed, control is transferred to block 101 which, in turn, returns control to block 77 if additional data values remain to be plotted, or terminates the print-plot operation if no data values remain to be plotted. To plot lines having a selected thickness, a plot element 47 of selected size may be used, or individual elements may be energized selectively to produce, along a selected orthogonal direction, a line made up of a desired number of contiguous dots. To print characters having a selected thickness, selected dot patterns may be used. Table 2 shows a listing of the individual instructions of the print-plot routine.

TABLE 2

Print-Plot Routine

| Sequence no. | ROM Address (in octal) | Object code | Subroutine label | Operation code (instructions) | | Remarks |
|---|---|---|---|---|---|---|
| 0674 | 03054 | 001055 | NXTPO | DEF | *+1* | |
| 0675 | 03055 | 001346 | | LDA | DEFG | CHECK DECELERATION FLAG |
| 0676 | 03056 | 072402 | | SZA | *+2 | SET DECELERATE |
| 0677 | 03057 | 066275 | | JMP | DECEL | |
| 0678 | 03060 | 005317 | | LDB | CHMOD | |
| 0679 | 03061 | 014043 | | CPB | 01 | ACCELERATE? |
| 0680 | 03062 | 066262 | | JMP | ACCEL | YES |
| 0681 | 03063 | 001353 | | LDA | SCNTR | |
| 0682 | 03064 | 072402 | | SZA | *+2 | TIME TO PRINT |
| 0683 | 03065 | 066252 | | JMP | KPSLW | NO. JUST SLEW |
| 0684 | 03066 | 014106 | | CPB | 07 | CRUISE? |
| 0685 | 03067 | 066212 | | JMP | LSTCH | YES |
| 0686 | 03070 | 024123 | | ADB | N4 | |
| 0687 | 03071 | 176002 | | SBP | *+2 | |
| 0688 | 03072 | 066145 | | JMP | FETDT | |
| 0689 | 03073 | 024117 | | ADB | N2 | |
| 0690 | 03074 | 176002 | | SBP | *+2 | |
| 0691 | 03075 | 066210 | | JMP | SPCE | |
| 0692 | 03076 | 001322 | NEWCH | LDA | TBUFF | FETCH NEW CHARACTER |
| 0693 | 03077 | 072405 | | RZA | FETAS | IF #0 THEN DO CHAR. |
| 0694 | 03100 | 045317 | | ISZ | CHMOD | SET CVHMOD = 7 |
| 0695 | 03101 | 000141 | | LDA | M12 | SET |
| 0696 | 03102 | 031354 | | STA | CLCNT | CRUISE COUNT |
| 0697 | 03103 | 066212 | | JMP | LSTCH | AND JUMP |
| 0698 | 03104 | 035322 | FETAS | STB | TBUFF | CLEAR TBUFF |
| 0699 | 03105 | 050055 | | AND | 0177 | MASK OFF EXTRA BITS |
| 0700 | 03106 | 010074 | | CPA | EOTCH | EOT? |
| 0701 | 03107 | 066124 | | JMP | EOTPT | YES |
| 0702 | 03110 | 010051 | | CPA | 017 | HANDSHAKE? |
| 0703 | 03111 | 066126 | | JMP | HSPRT | YES |
| 0704 | 03112 | 020124 | | ADA | N40 | ADD OFFSET |
| 0705 | 03113 | 030001 | | STA | B | MULTIPLY |
| 0706 | 03114 | 170600 | | SAL | 1 | BY |
| 0707 | 03115 | 024000 | | ADB | A | 3 |
| 0708 | 03116 | 000002 | | LDA | P | |
| 0709 | 03117 | 050061 | | AND | 0176K | |
| 0710 | 03120 | 022454 | | ADA | BLKAD | |
| 0711 | 03121 | 024000 | | ADB | A | ADD TO TABLE OFFSET |
| 0712 | 03122 | 035355 | STCAD | STB | CLDAD | CURR. LETTER DOT ADDR. |
| 0713 | 03123 | 066130 | | JMP | MODCG | CHANGE MODE AND CONTINUE |

TABLE 2—Continued

| Sequence no. | ROM Address (in octal) | Object code | Subroutine label | Operation code (instructions) | | Remarks |
|---|---|---|---|---|---|---|
| 0714 | 03124 | 006763 | EOTPT | LDB | EOTAD | |
| 0715 | 03125 | 066122 | | JMP | STCAD | |
| 0716 | 03126 | 006764 | HSPRT | LDB | HSAD | |
| 0717 | 03127 | 066122 | | JMP | STCAD | |
| 0718 | 03130 | 000070 | MODCG | LDA | 03 | SET |
| 0719 | 03131 | 031317 | | STA | CHMOD | CHMOD TO 3 |
| 0720 | 03132 | 000125 | | LDA | N5 | SET |
| 0721 | 03133 | 031354 | | STA | CLCNT | FOR 5 COLUMNS |
| 0722 | 03134 | 004135 | | LDB | P30 | |
| 0723 | 03135 | 040471 | | JSM | DCHEK | CHECK D PARAMETER |
| 0724 | 03136 | 024115 | | ADB | M10 | |
| 0725 | 03137 | 024115 | | ADB | M10 | |
| 0726 | 03140 | 024115 | | ADB | M10 | |
| 0727 | 03141 | 026330 | | ADB | MAK1 | CALCULATE START OF MASK |
| 0728 | 03142 | 035356 | | STB | MSKST | |
| 0729 | 03143 | 000042 | | LDA | OCT0 | |
| 0730 | 03144 | 031360 | | STA | FLOP | INITIALIZE FLOP |
| 0731 | 03145 | 045354 | FETDT | ISZ | CLCNT | INCREMENT CLCNT |
| 0732 | 03146 | 066150 | | JMP | *+2 | IF ≠0 CONTINUE |
| 0733 | 03147 | 045317 | | ISZ | CHMOD | IF =0 THEN SET FOR SPACE |
| 0734 | 03150 | 105355 | | LDB | CLOAD,I | |
| 0735 | 03151 | 001360 | | LDA | FLOP | |
| 0736 | 03152 | 170140 | | CMA | | |
| 0737 | 03153 | 031360 | | STA | FLOP | |
| 0738 | 03154 | 072003 | | RZA | *+3 | SKIP IF -1 |
| 0739 | 03155 | 174707 | | RBR | 8 | PUT BITS IN LEFT BYTE |
| 0740 | 03156 | 045355 | | ISZ | CLOAD | INCREMENT CLOAD AND CONTINUE |
| 0741 | 03157 | 174507 | | SBR | 8 | |
| 0742 | 03160 | 077003 | | SLB | *+3 | SKIP IF REFERENCED TO TOP |
| 0743 | 03161 | 024113 | | ADB | N1 | CLEAR TOP OR BOTTOM BIT |
| 0744 | 03162 | 174601 | | SBL | 2 | |
| 0745 | 03163 | 174500 | | SBR | 1 | |
| 0746 | 03164 | 040471 | | JSM | DCHEK | CHECK D PARAMETER |
| 0747 | 03165 | 000000 | | NOP | | |
| 0748 | 03166 | 066203 | | JMP | SKPRV | D= 1 OR 2 |
| 0749 | 03167 | 000000 | | NOP | | ELSE |
| 0750 | 03170 | 000150 | | LDA | M9 | SET |
| 0751 | 03171 | 031361 | | STA | RVCNT | REVERSE COUNT |
| 0752 | 03172 | 000042 | | LDA | OCT0 | |
| 0753 | 03173 | 174600 | | SBL | 1 | INITIALIZE REVERSE |
| 0754 | 03174 | 174500 | CONRV | SBR | 1 | |
| 0755 | 03175 | 170600 | | SAL | 1 | |
| 0756 | 03176 | 077002 | | SLB | *+2 | |
| 0757 | 03177 | 020043 | | ADA | O1 | |
| 0758 | 03200 | 045361 | | ISZ | RVCNT | |
| 0759 | 03201 | 066174 | | JMP | CONRV | |
| 0760 | 03202 | 030001 | | STA | B | |
| 0761 | 03203 | 040471 | SKPRV | JSM | DCHEK | CHECK D PARAMETER |
| 0762 | 03204 | 066217 | | JMP | PRT | |
| 0763 | 03205 | 042401 | | JSM | SWAP | |
| 0764 | 03206 | 066217 | | JMP | PRT | |
| 0765 | 03207 | 042401 | | JSM | SWAP | |
| 0766 | 03210 | 045317 | SPCE | ISZ | CHMOD | |
| 0767 | 03211 | 066216 | | JMP | ZEROS | |
| 0768 | 03212 | 045354 | LSTCH | ISZ | CLCNT | |

TABLE 2—Continued

| Sequence no. | ROM Address (in octal) | Object code | Subroutine label | Operation code (instructions) | Remarks |
|---|---|---|---|---|---|
| 0769 | 03213 | 066216 | | JMP ZEROS | STILL CRUISING |
| 0770 | 03214 | 045346 | | ISZ DEFG | DONE CRUISING, DECELERATE |
| 0771 | 03215 | 045345 | | ISZ OTEMP | |
| 0772 | 03216 | 004042 | ZEROS | LDB OCT0 | DO COLUMN OF ZEROS |
| 0773 | 03217 | 135337 | PRT | STB BUFPT,I | |
| 0774 | 03220 | 004042 | | LDB OCT0 | |
| 0775 | 03221 | 001356 | | LDA MSKST | |
| 0776 | 03222 | 031357 | | STA MSKPT | |
| 0777 | 03223 | 066231 | | JMP MK2 | |
| 0778 | 03224 | 101337 | MK1 | LDA BUFPT,I | |
| 0779 | 03225 | 151357 | | AND MSKPT,I | |
| 0780 | 03226 | 060001 | | IOR B | |
| 0781 | 03227 | 030001 | | STA B | |
| 0782 | 03230 | 045357 | | ISZ MSKPT | |
| 0783 | 03231 | 045337 | MK2 | ISZ BUFPT | |
| 0784 | 03232 | 000113 | | LDA N1 | |
| 0785 | 03233 | 111337 | | CPA BUFPT,I | |
| 0786 | 03234 | 042240 | | JSM MK3 | |
| 0787 | 03235 | 111357 | | CPA MSKPT,I | |
| 0788 | 03236 | 066244 | | JMP DONE | |
| 0789 | 03237 | 066224 | | JMP MK1 | |
| 0790 | 03240 | 000205 | MK3 | LDA BUFST | |
| 0791 | 03241 | 031337 | | STA BUFPT | |
| 0792 | 03242 | 000113 | | LDA N1 | |
| 0793 | 03243 | 170201 | | RET 1 | |
| 0794 | 03244 | 174603 | DONE | SBL 4 | POSITION BITS FOR |
| 0795 | 03245 | 035123 | | STB HEDWD | PRINTING AND STORE |
| 0796 | 03246 | 000217 | | LDA PRTST | SET |
| 0797 | 03247 | 031323 | | STA STROB | STROB |
| 0798 | 03250 | 000123 | | LDA N4 | RESET |
| 0799 | 03251 | 031353 | | STA SCNTR | SCNTR |
| 0800 | 03252 | 000102 | KPSLW | LDA O6 | |
| 0801 | 03253 | 030001 | | STA B | |
| 0802 | 03254 | 045353 | | ISZ SCNTR | |
| 0803 | 03255 | 066307 | | JMP OTPT | |
| 0804 | 03256 | 174600 | | SBL 1 | |
| 0805 | 03257 | 011317 | | CPA CHMOD | |
| 0806 | 03260 | 066313 | | JMP OTPT1 | |
| 0807 | 03261 | 066307 | | JMP OTPT | |
| 0808 | 03262 | 045345 | ACCEL | ISZ OTEMP | INCREMENT OTEMP |
| 0809 | 03263 | 045347 | | ISZ TACCT | IF TACCT ≠0 THEN |
| 0810 | 03264 | 066307 | | JMP OTPT | KEEP ACCELERATING |
| 0811 | 03265 | 004220 | | LDB SLWCT | ELSE DO ONE SAMPLE OF SLEW |
| 0812 | 03266 | 035345 | | STB OTEMP | |
| 0813 | 03267 | 024043 | | ADB O1 | |
| 0814 | 03270 | 000042 | | LDA OCT0 | SET |
| 0815 | 03271 | 031353 | | STA SCNTR | SCNTR TO PRINT |
| 0816 | 03272 | 000102 | | LDA O6 | SET CHMOD TO FETCH |
| 0817 | 03273 | 031317 | | STA CHMOD | NEW CHARACTER |
| 0818 | 03274 | 066313 | | JMP OTPT1 | OUTPUT |
| 0819 | 03275 | 055345 | DECEL | DSZ OTEMP | IF STILL DECELERATING |
| 0820 | 03276 | 066307 | | JMP OTPT | OUTPUT |
| 0821 | 03277 | 000042 | | LDA OCT0 | ELSE |
| 0822 | 03300 | 031111 | | STA USER | CLEAR USER |
| 0823 | 03301 | 031346 | | STA DEFG | CLEAR DEFG |

TABLE 2—Continued

| Sequence no. | ROM Address (in octal) | Object code | Subroutine label | Operation code (instructions) | Remarks |
|---|---|---|---|---|---|
| 0824 | 03302 | 011320 | | CPA DEFFG | |
| 0825 | 03303 | 165127 | | JMP INRET,I | |
| 0826 | 03304 | 001112 | | LDA XPRES | |
| 0827 | 03305 | 031316 | | STA LSTCX | |
| 0828 | 03306 | 165127 | | JMP INRET,I | |
| 0829 | 03307 | 005345 | OTPT | LDB OTEMP | |
| 0830 | 03310 | 001323 | | LDA STROB | |
| 0831 | 03311 | 072402 | | SZA *+2 | |
| 0832 | 03312 | 044001 | | ISZ B | |
| 0833 | 03313 | 040471 | OTPT1 | JSM DCHEK | |
| 0834 | 03314 | 066324 | | JMP MTROT | |
| 0835 | 03315 | 066323 | | JMP *+6 | |
| 0836 | 03316 | 173301 | | SOC *+1,S | |
| 0837 | 03317 | 000064 | | LDA SNBIT | |
| 0838 | 03320 | 060001 | | IOR B | |
| 0839 | 03321 | 030001 | | STA B | |
| 0840 | 03322 | 173602 | | SOS *+2,C | |
| 0841 | 03323 | 174607 | | SBL B | |
| 0842 | 03324 | 034000 | MTROT | STB A | |
| 0843 | 03325 | 031200 | | STA XYOUT | |
| 0844 | 03326 | 141121 | | JSM OUTXY,I | |
| 0845 | 03327 | 165127 | | JMP INRET,I | |
| 0847 | 03330 | 003331 | MAK1 | DEF *+1 | |
| 0848 | 03331 | 000001 | | OCT 1,10,100,2,20,200,4,40,400,-1 | |
| | 03332 | 000010 | | | |
| | 03333 | 000100 | | | |
| | 03334 | 000002 | | | |
| | 03335 | 000020 | | | |
| | 03336 | 000200 | | | |
| | 03337 | 000004 | | | |
| | 03340 | 000040 | | | |
| | 03341 | 000400 | | | |
| | 03342 | 177777 | | | |
| 0849 | 03343 | 000400 | | OCT 400,200,100,40,20,10,4,2,1,-1 | |
| | 03344 | 000200 | | | |
| | 03345 | 000100 | | | |
| | 03346 | 000040 | | | |
| | 03347 | 000020 | | | |
| | 03350 | 000010 | | | |
| | 03351 | 000004 | | | |
| | 03352 | 000002 | | | |
| | 03353 | 000001 | | | |
| | 03354 | 177777 | | | |
| 0850 | 03355 | 000400 | | OCT 400,40,4,200,20,2,100,10,1,-1 | |
| | 03356 | 000040 | | | |
| | 03357 | 000004 | | | |
| | 03360 | 000200 | | | |
| | 03361 | 000020 | | | |
| | 03362 | 000002 | | | |
| | 03363 | 000100 | | | |
| | 03364 | 000010 | | | |
| | 03365 | 000001 | | | |
| | 03366 | 177777 | | | |
| 0851 | 03367 | 000001 | | OCT 1 | |
| 0852 | 03370 | 000002 | MSK2 | OCT 2 | |

TABLE 2-Continued

| Sequence no. | ROM Address (in octal) | Object code | Subroutine label | Operation code (instructions) | Remarks |
| --- | --- | --- | --- | --- | --- |
| 0853 | 03371 | 000004 | MSK3 | OCT 4 | |
| 0854 | 03372 | 000010 | MSK4 | OCT 10,20 | |
| | 03373 | 000020 | | | |
| 0855 | 03374 | 000040 | MSK6 | OCT 40 | |
| 0856 | 03375 | 000100 | MSK7 | OCT 100 | |
| 0857 | 03376 | 000200 | MSK8 | OCT 200,400,-1 | |
| | 03377 | 000400 | | | |
| | 03400 | 177777 | | | |

We claim:

1. A system for forming visual output manifestations on a web, comprising:

head means having a plurality of print elements engaging said web, each element being located at the intersection of first and second coordinate positions in the head, with no element occupying the same first coordinate position and no element occupying the same second coordinate position;

drive means coupled to at least one of the web and the head means for providing relative motion of the head means with respect to the web along two orthogonal coordinates; and logic means disposed to receive data and coupled to the drive means and to the head means for forming visual output manifestations on the web in one of four directions along the two orthogonal coordinates by causing the drive means to move at least one of the web and head means to a selected position and energizing selected elements of the head means to form selected portions of the visual output manifestations in response to said data.

2. The system as in claim 1 wherein each first coordinate of the print elements is a row coordinate and each second coordinate is a column coordinate, the print elements being symmetrically located about at least one of two substantially 45° diagonals.

3. The system as in claim 1 wherein the logic means includes a stored routine for producing alphanumeric characters, the web is thermally sensitive paper, and the print elements comprise at least nine thermal resistive elements.

4. The system as in claim 1 wherein the head means includes a plot element for plotting lines on the web.

5. The system as in claim 2 wherein the print elements are aligned in overlapping contiguity along the coordinates, this arrangement being effective for producing contiguous partly-overlapping marks on the web.

6. The system as in claim 5 wherein the drive means includes a web drive means and a head drive means, and the logic means controls the head means, the head drive means, the web drive means and controls the energizing of selected numbers of those elements contiguously aligned along a selected coordinate, to produce line segments in the direction of the selected coordinate having thickness related to the number of elements energized.

7. A method of forming output manifestations on a web using a movable head with a plurality of print elements to form portions of each output manifestation in one of four orthogonal directions, the method comprising the steps of:

selecting a number of elements to be energized;

positioning one of the head and web with the selected elements located over selected portions of the output manifestation to be formed in such a manner that at each positioning no more than one element is located over a column of the output manifestation to be printed, and no more than one element is located over a row of the output manifestation to be printed; and energizing the selected elements to form portions of the output manifestation in one of four orthogonal directions.

8. The method of claim 7 where the step of positioning includes the steps of moving the head in a first direction to produce output manifestations oriented in said first direction, and moving the head in a second direction to produce output manifestations oriented in said second direction.

9. The method of claim 7 where the step of positioning further includes the steps of moving the web in a third direction to produce output manifestations oriented in a fourth direction opposite to said third direction, and moving the web in a fourth direction to produce output manifestations oriented in the third direction.

10. The method of claim 7 where the movable head includes a plot element for forming lines on the web in any selected direction and the method includes the steps of:

selecting the plot element to be energized;

positioning one of the head and web such that the plot element is located over a segment of the line to be formed; and energizing the plot element to form the line segment in the selected direction.

11. A print head comprising a cluster of a selected number of print elements disposed on and about at least two diagonals for forming output manifestations on a web in any of four orthogonal directions, such elements being located at the intersection of first and second coordinate positions, with no element occupying the same first coordinate position and no element occupying the same second coordinate position.

12. The print head as in claim 11 wherein each first coordinate of the print element is a row coordinate and each second coordinate is a column coordinate 13. The print head as in claim 11 wherein the print elements are aligned in overlapping contiguity along the coordinates for producing partly-overlapping contiguous output manifestations on the web.

14. The print head as in claim 11 wherein the print elements are disposed having independent conductor leads and a common ground lead.

15. The print head as in claim 11 wherein a first group of the selected number of print elements are used for printing output manifestations in the form of upper case characters, a second group of said elements are used for printing lower case characters, and a third group of said elements are used to print punctuation characters.

16. The print head as in claim 11 including a plot element disposed externally to the cluster of print elements for plotting lines.

17. A system for forming visual output manifestations on a web, comprising:
    head means having a plurality of print elements and a plot element engaging said web, each element being located at the intersection of first and second coordinate positions in the head, with no element occupying the same first coordinate position and no element occupying the same second coordinate position;
    drive means coupled to at least one of the web and the head means for providing relative motion of the head means with respect to the web along two orthogonal coordinates; and
    logic means disposed to receive data and coupled to the drive means and to the head means for substantially simultaneously printing and plotting visual output manifestations on the web in one of four directions along the two orthogonal coordinates by causing the drive means to move at least one of the web and head means to a selected position and energizing selected elements of the head means to form selected portions of the visual output manifestations in response to said data.

18. A method of substantially simultaneously printing and plotting visual output manifestations on a web using a movable head with a plurality of print elements and a plot element to form portions of each output manifestations in one of four orthogonal directions, the method comprising the steps of:
    selecting a number of elements to be energized;
    positioning one of the head and web with the selected elements located over selected portions of the output manifestation to be formed in such a manner that at each positioning no more than one element is located over a column of the output manifestation to be printed, and no more than one element is located over a row of the output manifestation to be printed; and
    energizing the selected elements to form portions of the output manifestation in one of four orthogonal directions.

19. A print head comprising a plot element and a cluster of a selected number of print elements disposed on and about at least two diagonals for printing and plotting substantially simultaneously and forming output manifestations on a web in any of four orthogonal directions, such elements being located at the intersection of first and second coordinate positions, with no element occupying the same first coordinate position and no element occupying the same second coordinate position.

* * * * *

UNITED STATES PATENT AND TRADEMARK OFFICE
CERTIFICATE OF CORRECTION

PATENT NO. : 4,070,680
DATED : 01/24/78
INVENTOR(S) : David J. Shelley

It is certified that error appears in the above-identified patent and that said Letters Patent are hereby corrected as shown below:

Column 1, line 23, "powder" should read --power--.

Column 2, line 28, "(from +Y to -Y)" should read
    --(from +y to -y)--.

Column 3, line 39, "lead" should read --leads--.

Table 1, under the column heading "Example of character
    orientation":
        On the third line under said heading, insert -- 'd--
        On the fifth line under said heading, insert -- ₐ͗ --
        On the seventh line under said heading, insert -- ᵈ͗ --
        On the ninth line under said heading, "P" should
        read --p--.

Table 1, under the column heading "Element used to form
    character in order of use, from left to right":
        On the fourth line under said heading, insert
        --E3,E6,E9--.

UNITED STATES PATENT AND TRADEMARK OFFICE
CERTIFICATE OF CORRECTION

PATENT NO. : 4,070,680

DATED : 01/24/78

INVENTOR(S) : David J. Shelley

It is certified that error appears in the above-identified patent and that said Letters Patent are hereby corrected as shown below:

Table 1, under the column heading "Element used to form descender portion (in order of use)":
On the fourth line under said heading, delete "E3,E6,E9".

Column 4, line 7, "elements" should read --element--.

Column 16, line 10, "tions" should read --tion--.

Signed and Sealed this

Twentieth Day of June 1978

[SEAL]

Attest:

RUTH C. MASON
*Attesting Officer*

DONALD W. BANNER
*Commissioner of Patents and Trademarks*

UNITED STATES PATENT AND TRADEMARK OFFICE
CERTIFICATE OF CORRECTION

PATENT NO. : 4,070,680
DATED : January 24, 1978
INVENTOR(S) : David J. Shelby and Rick A. Warp It is certified that error appears in the above-identified patent and that said Letters Patent are hereby corrected as shown below:

Please add the following name:

RICK A. WARP to line [75] on the first page of the above-identified patent.

Signed and Sealed this

Eighth Day of May 1979

[SEAL]

Attest:

RUTH C. MASON
Attesting Officer

DONALD W. BANNER
Commissioner of Patents and Trademarks